(12) United States Patent
McGrath

(10) Patent No.: US 9,720,668 B2
(45) Date of Patent: Aug. 1, 2017

(54) CREATING AND MAINTAINING MULTI-TENANT APPLICATIONS IN A PLATFORM-AS-A-SERVICE (PAAS) ENVIRONMENT OF A CLOUD COMPUTING SYSTEM

(75) Inventor: Michael P. McGrath, Schaumburg, IL (US)

(73) Assignee: Red Hat, Inc., Raleigh, NC (US)

( * ) Notice: Subject to any disclaimer, the term of this patent is extended or adjusted under 35 U.S.C. 154(b) by 449 days.

(21) Appl. No.: 13/408,754

(22) Filed: Feb. 29, 2012

(65) Prior Publication Data

US 2013/0227563 A1 Aug. 29, 2013

(51) Int. Cl.
G06F 9/455 (2006.01)
G06F 9/445 (2006.01)

(52) U.S. Cl.
CPC ............ *G06F 8/60* (2013.01); *G06F 9/45533* (2013.01)

(58) Field of Classification Search
None
See application file for complete search history.

(56) References Cited

U.S. PATENT DOCUMENTS

| | | | |
|---|---|---|---|
| 6,009,452 A | 12/1999 | Horvitz | |
| 7,774,761 B2 | 8/2010 | Vohra | |
| 7,853,708 B2 | 12/2010 | Townsley et al. | |
| 8,352,941 B1 | 1/2013 | Protopopov et al. | |
| 8,356,274 B2 | 1/2013 | Kwok et al. | |
| 8,505,006 B1 * | 8/2013 | Larkin et al. ..................... 718/1 |
| 8,635,351 B2 | 1/2014 | Astete et al. | |
| 2002/0087958 A1 | 7/2002 | Krause | |
| 2002/0091753 A1 | 7/2002 | Reddy et al. | |
| 2005/0160428 A1 | 7/2005 | Ayachitula et al. | |
| 2006/0277305 A1 | 12/2006 | Bernardin et al. | |
| 2007/0128899 A1 | 6/2007 | Mayer | |
| 2007/0147347 A1 | 6/2007 | Ristock | |
| 2007/0203999 A1 | 8/2007 | Townsley et al. | |
| 2008/0028071 A1 | 1/2008 | Miyajima | |

(Continued)

OTHER PUBLICATIONS

Unix man unshare clone, Janak Desai, Jan. 11, 2006; p. 1-5.*

(Continued)

*Primary Examiner* — Dong Kim
(74) *Attorney, Agent, or Firm* — Lowenstein Sandler LLP

(57) ABSTRACT

A mechanism for creating and maintaining multi-tenant applications in a Platform-as-a-Service (PaaS) environment of a cloud computing system is disclosed. A method includes receiving, by a virtual machine (VM), a request to start an application on the VM, wherein the VM hosts multi-tenant applications associated with owners different than an owner of the requested application, creating unique kernel namespace directories for the application, wherein each unique kernel namespace directory corresponds to one of a plurality of standard directories on an OS of the VM, providing identification of the created unique namespace directories to the application, wherein the application does not update code of the application to access the unique kernel namespace directories, receiving an access request to one of the standard directories, mapping the requested standard directory to a corresponding unique kernel namespace directory of the application, and directing the application to the corresponding unique kernel namespace directory.

20 Claims, 5 Drawing Sheets

(56) References Cited

U.S. PATENT DOCUMENTS

| | | | |
|---|---|---|---|
| 2008/0036488 | A1 | 2/2008 | Kelem et al. |
| 2008/0163004 | A1 | 7/2008 | Yu |
| 2008/0313639 | A1 | 12/2008 | Kumar et al. |
| 2008/0320474 | A1* | 12/2008 | Jelinek et al. .................... 718/1 |
| 2009/0024609 | A1 | 1/2009 | Barker et al. |
| 2009/0313374 | A1 | 12/2009 | Murphy et al. |
| 2009/0313620 | A1 | 12/2009 | Sedukhin et al. |
| 2010/0122343 | A1 | 5/2010 | Ghosh et al. |
| 2010/0153951 | A1 | 6/2010 | Jones |
| 2010/0262467 | A1 | 10/2010 | Barnhill, Jr. et al. |
| 2010/0275241 | A1 | 10/2010 | Srinivasan |
| 2011/0055310 | A1 | 3/2011 | Shavlik et al. |
| 2011/0083131 | A1 | 4/2011 | Pirzada et al. |
| 2011/0231899 | A1* | 9/2011 | Pulier ................ G06F 9/45558 726/1 |
| 2011/0246617 | A1* | 10/2011 | Sheehan et al. ............. 709/219 |
| 2011/0252320 | A1 | 10/2011 | Arrasvuouri et al. |
| 2011/0276584 | A1* | 11/2011 | Cotner et al. ................ 707/769 |
| 2011/0277027 | A1 | 11/2011 | Hayton et al. |
| 2011/0302415 | A1 | 12/2011 | Ahmad et al. |
| 2012/0004041 | A1 | 1/2012 | Pereira et al. |
| 2012/0011077 | A1 | 1/2012 | Bhagat |
| 2012/0096165 | A1 | 4/2012 | Madduri et al. |
| 2012/0173581 | A1* | 7/2012 | Hartig et al. ................ 707/781 |
| 2012/0174099 | A1 | 7/2012 | Ashok et al. |
| 2012/0185913 | A1 | 7/2012 | Martinez et al. |
| 2012/0215919 | A1 | 8/2012 | Labat et al. |
| 2012/0246740 | A1 | 9/2012 | Brooker et al. |
| 2013/0005487 | A1 | 1/2013 | Frazzini et al. |
| 2013/0007239 | A1 | 1/2013 | Agarwal et al. |
| 2013/0019243 | A1 | 1/2013 | Schmidt et al. |
| 2013/0036208 | A1 | 2/2013 | Dochez |
| 2013/0055243 | A1 | 2/2013 | Dandekar et al. |
| 2013/0227560 | A1 | 8/2013 | McGrath et al. |
| 2013/0227561 | A1 | 8/2013 | Walsh et al. |
| 2013/0227563 | A1 | 8/2013 | McGrath et al. |
| 2013/0227635 | A1 | 8/2013 | Walsh et al. |
| 2013/0297672 | A1 | 11/2013 | McGrath et al. |
| 2013/0297673 | A1 | 11/2013 | McGrath et al. |
| 2013/0297685 | A1 | 11/2013 | McGrath et al. |
| 2013/0297795 | A1 | 11/2013 | McGrath et al. |
| 2013/0298183 | A1 | 11/2013 | McGrath et al. |
| 2013/0305243 | A1 | 11/2013 | Hiki |
| 2014/0040883 | A1 | 2/2014 | Tompkins |

OTHER PUBLICATIONS

Linux man page pam_namespace; http://web.archive.org/web/20081014010639/http://linux.die.net/man/8/pam_namespace; Oct. 14, 2008.*

Wiki LXC; http://web.archive.org/web/20120130164103/http://en.wikipedia.org/wiki/LXC; Jan. 30, 2012.*

Filesystem_Labeling_SELinux_2004; James Morris; Nov. 2004.*

Wikipedia http://web.archive.org/web/20111228040353/http://en.wikipedia.org/wiki/Special_folder; special folder; Dec. 28, 2011.*

USPTO, Office Action for U.S. Appl. No. 13/461,705 mailed Jan. 30, 2014.

USPTO, Office Action for U.S. Appl. No. 13/461,712 mailed Feb. 27, 2014.

USPTO, Notice of Allowance for U.S. Appl. No. 13/461,584 mailed Jan. 29, 2014.

USPTO, Office Action for U.S. Appl. No. 13/408,729 mailed Mar. 12, 2014.

USPTO, Office Action for U.S. Appl. No. 13/408,676 mailed Feb. 27, 2014.

USPTO, Office Action for U.S. Appl. No. 13/461,722 mailed Sep. 20, 2013.

The Authoritative Dictionary of IEEE Standards Terms. 2000, Standards Information Network IEEE Press. seventh edition. p. 131 and 530.

Corcoran et al. Cross-Tier, Label-based Secuirty Enforcement for Web Applications. 2009. ACM. pp. 269-281.

Red Hat Inc., Red Hat Enterpise Linux 5 Deployment guide, "Deployment, configuration and administration of Red Hat Enterprise Linux 5", Chapter 46—Security and SELinux, pp. 823-848, 26 pages, Jul. 21, 2011.

Smalley, Stephen D. SELinux. 2001.NSA. pp. 1-23.

Loscocco et al. Meeting Critical Security Objectives with Security-Enhanced Linux. 2001. NSA. pp. 1-11.

USPTO, Final Office Action for U.S. Appl. No. 13/461,705 mailed Aug. 7, 2014.

USPTO, Office Action for U.S. Appl. No. 13/408,001 mailed Jul. 16, 2014.

USPTO, Notice of Allowance for U.S. Appl. No. 13/461,584 mailed May 22, 2014.

USPTO, Office Action for U.S. Appl. No. 13/461,715 mailed Jul. 23, 2014.

Maoke Chen and Akihiro Nakao, "Feather-Weight Network Namespace Isolation Baased on User-Specific Addressing and Routing in Commodity OS," T. Magedanz et al. (EDS.): TridentCom 2010, LNICST 46, pp. 53-68, 2011.

An Quin et al., "Xconveryer: Guarantee Hadoop Throughput via Lightweight OS-level Virtualization," 2009 Eighth International Conference on Grid and Cooperative Computing, IEEE 2009, pp. 299-304.

Anup K. Ghosh and Angelos Stavrou, "Darpa Mobivisor: An Architecture for High Assurance for Untrusted Applications on Wireless Handheld Devices Via Lightweight Virtualization," Nov. 2010, 28 pages.

Authors et al., "Apparatus and Method of Tenant Context Generation and Propagation in SaaS Environment," Aug. 19, 2010, ip.com. pp. 1-4.

USPTO, Notice of Allowance for U.S. Appl. No. 13/461,705 mailed Nov. 7, 2014.

USPTO, Notice of Allowance for U.S. Appl. No. 13/461,705 mailed Sep. 22, 2015.

USPTO, Notice of Allowance for U.S. Appl. No. 13/408,001 mailed Feb. 18, 2015.

USPTO, Notice of Allowance for U.S. Appl. No. 13/408,729 mailed Sep. 29, 2014.

USPTO, Notice of Allowance for U.S. Appl. No. 13/408,729 mailed Jan. 22, 2015.

USPTO, Final Office Action for U.S. Appl. No. 13/461,715 mailed Feb. 10, 2015.

USPTO, Advisory Action for U.S. Appl. No. 13/461,715 mailed Apr. 30, 2015.

USPTO, Office Action for U.S. Appl. No. 13/461,715 mailed Sep. 24, 2015.

USPTO, Notice of Allowance for U.S. Appl. No. 13/408,676 mailed Oct. 7, 2014.

USPTO, Notice of Allowance for U.S. Appl. No. 13/408,676 mailed Jan. 23, 2015.

USPTO, Office Action for U.S. Appl. No. 14/474,694 mailed Aug. 26, 2015.

USPTO, Notice of Allowance for U.S. Appl. No. 14/474,694, mailed Jan. 4, 2016.

USPTO, Office Action for U.S. Appl. No. 13/461,715, mailed Apr. 19, 2016.

USPTO, Notice of Allowance for U.S. Appl. No. 13/461,715, mailed Dec. 29, 2016.

* cited by examiner

CREATING AND MAINTAINING MULTI-TENANT APPLICATIONS IN A PLATFORM-AS-A-SERVICE (PAAS) ENVIRONMENT OF A CLOUD COMPUTING SYSTEM

CROSS-REFERENCE TO RELATED APPLICATIONS

The present application is related to co-filed U.S. patent application Ser. No. 13/408,001 entitled "Mechanism for System Resource Sharing in a Multi-Tenant Platform-as-a-Service (PaaS) Environment in a Cloud Computing System"; co-filed U.S. patent application Ser. No. 13/408,729 entitled "Mechanism for Applying Security Category Labels to Multi-Tenant Applications of a Node in a Platform-as-a-Service (PaaS) Environment"; and co-filed U.S. patent application Ser. No. 13/408,676 entitled "Mechanism for Applying a Custom Security Type Label to Multi-Tenant Applications of a Node in a Platform-as-a-Service (PaaS) Environment"; which are all assigned to the assignee of the present application.

TECHNICAL FIELD

The embodiments of the invention relate generally to platform-as-a-service (PaaS) environments and, more specifically, relate to a mechanism for creating and maintaining multi-tenant applications in a PaaS environment of a cloud computing system.

BACKGROUND

Cloud computing is a computing paradigm in which a customer pays a "cloud provider" to execute a program on computer hardware owned and/or controlled by the cloud provider. It is common for cloud providers to make virtual machines hosted on its computer hardware available to customers for this purpose. The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include such software components as a kernel and an operating system. Customers, that have installed and are executing their programs "in the cloud", typically communicate with the executing program from remote geographic locations using Internet protocols.

For programs that are web applications, the additional software can further include such software components as middleware and a framework. Web applications are programs that receive and act on requests in web or other Internet protocols, such as HTTP. It is common for a user to use a web application by using a browser executing on the user's client computer system to send requests in a web protocol via the Internet to a server computer system on which the web application is executing. It is also common for automatic user agents to interact with web applications in web protocols in the same fashion.

While many web applications are suitable for execution in the cloud, it often requires significant expertise and effort in order to install, execute, and manage a web application in the cloud. For example, an administrator typically should identify all of the software components that a web application needs in order to execute, and what versions of those software components are acceptable. In addition, the administrator typically should obtain, install, and appropriately configure each such software component, as well as the application itself. Where this high level of expertise and effort has been invested in order to get a web application running on a particular hypervisor and in a particular provider's cloud, a similarly high level of expertise and effort usually should be subsequently invested to execute the web application instead or in addition on a different hypervisor and/or in a different particular provider's cloud. Also, it can be difficult to obtain useful information about how the application is performing and otherwise behaving when executing in the cloud.

Accordingly, software and/or hardware facilities for facilitating the execution of web applications in the cloud have been introduced, and are known as Platform-as-a-Service (PaaS) offerings. PaaS offerings typically facilitate deployment of applications without the cost and complexity of buying and managing the underlying hardware and software and provisioning hosting capabilities, providing all of the facilities required to support the complete life cycle of building and delivering web application and service entirely available from the Internet. Typically, these facilities operate as one or more virtual machines (VMs) running on top of a hypervisor in a host server.

In present PaaS offerings, a first customer's deployed applications do not co-exist with any other customer's deployed applications on the VMs that are hosting the first customer's deployed applications. However, such an arrangement can be inefficient to the PaaS provider offering the platform services. This is because the applications being deployed in the PaaS are generally quite small packages, and the size of the VM does not correspond to the size of the application. It can be costly to initialize a new VM for each application deployment, and it may also be a waste of resources that are not being utilized. In a public cloud environment, a PaaS provider pays for deploying a VM whether the VM lies idle or not. In a private cloud environment, there is still a strain on resources for running VMs that are not completely utilized.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
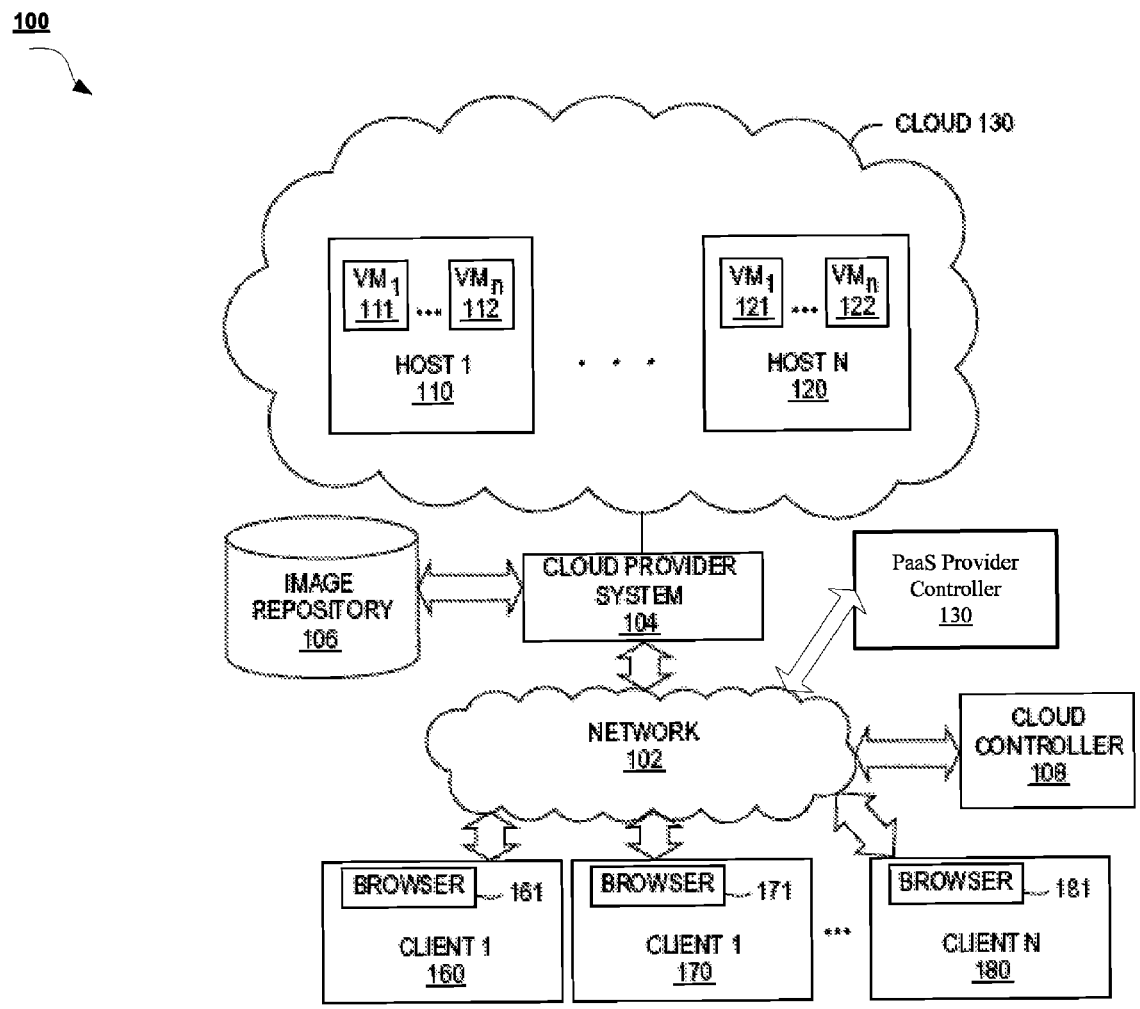
FIG. 1 is a block diagram of a network architecture in which embodiments of the invention may operate.

Embodiments of the invention provide a mechanism for creating and maintaining multi-tenant applications in a Platform-as-a-Service (PaaS) environment of a cloud computing system. A method of embodiments of the invention includes receiving, by a virtual machine (VM), a request to start an application on the VM, wherein the VM hosts multi-tenant applications associated with owners different than an owner of the requested application, creating unique kernel namespace directories for the application, wherein each unique kernel namespace directory corresponds to one of a plurality of standard directories on an OS of the VM, providing identification of the created unique namespace directories to the application, wherein the application does not update code of the application to access the unique kernel namespace directories, receiving an access request to one of the standard directories, mapping the requested standard directory to a corresponding unique kernel namespace directory of the application, and directing the application to the corresponding unique kernel namespace directory.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "executing", "applying", "identifying", "configuring", "establishing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the invention provide a mechanism for creating and maintaining multi-tenant applications in a PaaS environment of a cloud computing system. In the multi-tenant PaaS environment, each node (i.e., virtual machine (VM)) runs multiple applications, and, as such, should provide security and separation to protect each of the multi-tenant applications from each other and to protect the underlying node (VM) from the multi-tenant applications. In one embodiment, a kernel namespaces feature of the Operating System (OS) kernel is utilized to secure individual applications within a node (e.g., VM) running on the cloud. Kernel namespaces allows different processes to have different views of the file system.

In embodiments of the invention, when an application is spun up (created) on a node, kernel namespaces is applied to each application on the node. When an application is run, kernel namespaces creates a dedicated and unique configuration directory for the application. As a result, the application is not visible to other applications running on the node and vice versa.

FIG. 1 is a block diagram of a network architecture 100 in which embodiments of the invention may operate. The network architecture 100 includes a cloud 130 managed by a cloud provider system 104. The cloud 130 provides VMs, such as VMs 111, 112, 121, and 122. Each VM is hosted on a physical machine, such as host 1 110 through host N 120, configured as part of the cloud 130. In some embodiments, the host machines 110, 120 are often located in a data center. For example, virtual machines 111 and 112 are hosted on physical machine 110 in cloud 130 provided by cloud provider 104. Users can interact with applications executing on the cloud-based VMs 112, 112, 121, 122 using client computer systems, such as clients 160, 170 and 180, via corresponding web browser applications 161, 171 and 181.

Clients 160, 170 and 190 are connected to hosts 110, 120 and the cloud provider system 104 via a network 102, which may be may be a private network (e.g., a local area network (LAN), a wide area network (WAN), intranet, or other similar private networks) or a public network (e.g., the Internet). Each client 160, 170, 190 may be a mobile device, a PDA, a laptop, a desktop computer, or any other computing device. Each host 110, 120 may be a server computer system, a desktop computer or any other computing device. The cloud provider system 104 may include one or more machines such as server computers, desktop computers, etc.

In one embodiment, the cloud provider system 104 is coupled to a cloud controller 108 via the network 102. The cloud controller 108 may reside on one or more machines (e.g., server computers, desktop computers, etc.) and may manage the execution of applications in the cloud 130. In some embodiments, cloud controller 108 receives commands from PaaS provider controller 130. Based on these commands, the cloud controller 108 provides data (e.g., such as pre-generated images) associated with different applications to the cloud provider system 104. In some embodiments, the data may be provided to the cloud provider 104 and stored in an image repository 106, in an image repository (not shown) located on each host 110, 120, or in an image repository (not shown) located on each VM 111, 112, 121, 122.

Upon receiving a command identifying specific data (e.g., application data and files used to initialize an application on the cloud), the cloud provider 104 retrieves the corresponding data from the image repository 106, creates an instance of it, and loads it to the host 110, 120 to run on top of a hypervisor (not shown) as a VM 111, 112, 121, 122 or within a VM 111, 112, 121, 122. In addition, a command may identify specific data to be executed on one or more of the VMs 111, 112, 121, 122. The command may be received from the cloud controller 108, from a PaaS provider controller 130, or a user (e.g., a system administrator) via a console computer or a client machine. The image repository 106 may be local or remote and may represent a single data structure or multiple data structures (databases, repositories, files, etc.) residing on one or more mass storage devices, such as magnetic or optical storage based disks, solid-state drives (SSDs) or hard drives.

In one embodiment, the PaaS provider controller 130 is operated by a PaaS provider that enables customers to create and run applications on nodes, e.g., VMs 111, 112, 121, 122, managed by the PaaS provider. In one embodiment, the nodes/VMs 111, 112, 121, 122 are hosted on computer hardware managed by the cloud provider system 104. In some embodiments, the VMs 111, 112, 121, 122 of the PaaS provider support multi-tenancy of applications running on the VMs 111, 112, 121, 122. This means that each VM 111, 112, 121, 122 can run multiple applications that may be owned or managed by different customers. Embodiments of the invention provide for security between these multi-tenant applications hosted on a VM 111, 112, 121, 122, as well as between the applications and the VM, by setting up each VM 111, 112, 121, 122 to utilize a kernel namespace feature of an operating system (OS) of the VM 111, 112, 121, 122. The kernel namespace feature creates and maintains a separation between the applications on the VM 111, 112, 121, 122, and between the application and the underlying system of the VM, for security purposes.

While various embodiments are described in terms of the environment described above, those skilled in the art will appreciate that the facility may be implemented in a variety of other environments including a single, monolithic computer system, as well as various other combinations of computer systems or similar devices connected in various ways.

Figure 2:
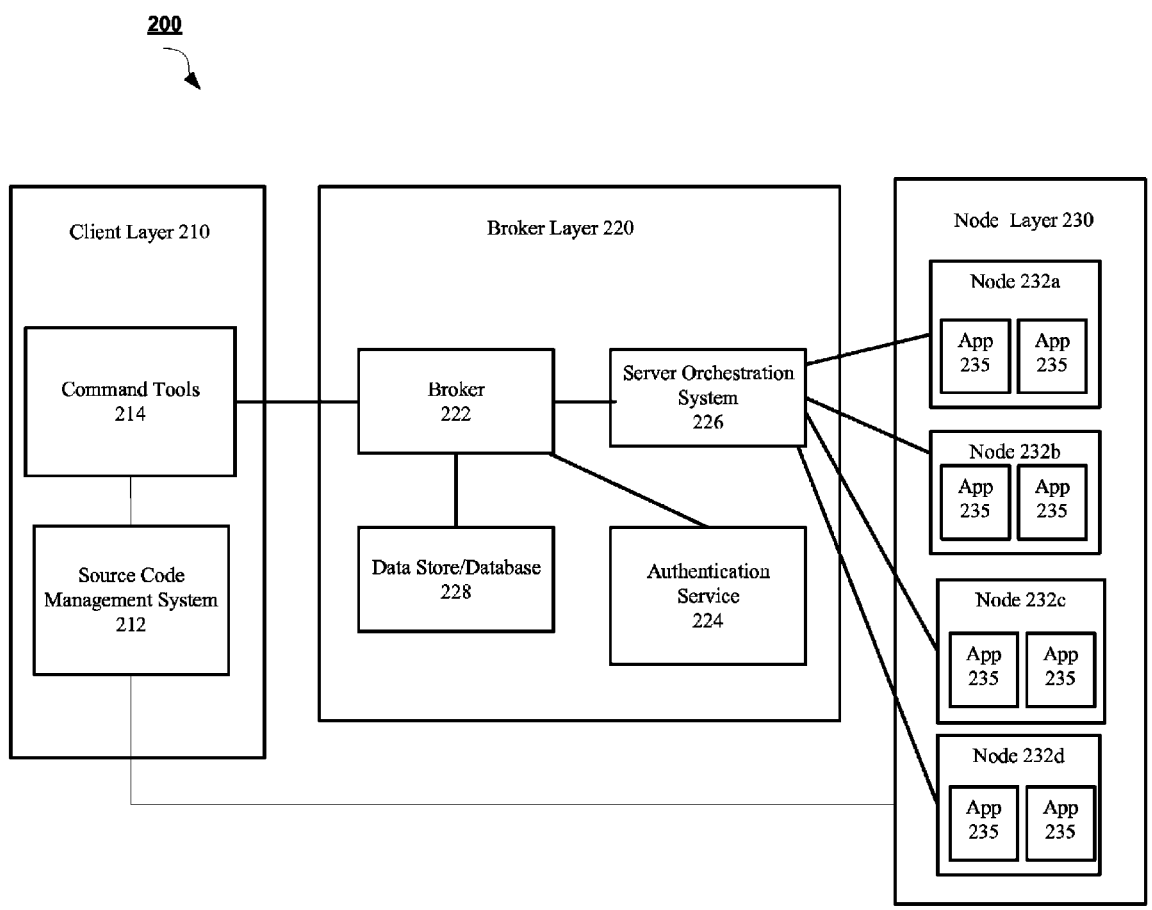
FIG. 2 is a block diagram of a PaaS system architecture according to an embodiment of the invention.

FIG. 2 is a block diagram of a PaaS system architecture 200 in accordance with some embodiments of the invention. The PaaS architecture 200 allows users to launch software applications in a cloud computing environment, such as cloud computing environment provided in network architecture 100 described with respect to FIG. 1. The PaaS system architecture 200, in one embodiment, includes a client layer 210, a broker layer 220, and a node layer 230.

In one embodiment, the client layer 210 resides on a client machine, such as a workstation of a software developer, and provides an interface, to a user of the client machine, to the broker layer 220 of the PaaS system. For example, the broker layer 220 may facilitate the creation and deployment on the cloud (via node layer 230) of software applications being developed by an end user at client layer 210.

The client layer 210 includes a source code management system 212, sometimes referred to as "SCM" or revision control system. One example of such an SCM or revision control system is Git, available as open source software. Git, and other such distributed SCM systems, usually include a working directory for making changes, and a local software repository for storing the changes. The packaged software application can then be "pushed" from the local Git repository to a remote Git repository. From the remote repository, the code may be edited by others with access, or the application may be executed by a machine. Other SCM systems work in a similar manner.

The client layer 210, in one embodiment, also includes a set of command tools 214 that a user can utilize to create, launch, and manage applications. In one embodiment, the command tools 214 can be downloaded and installed on the user's client machine, and can be accessed via a command line interface or a graphical user interface, or some other type of interface. In one embodiment, the command tools 214 expose an application programming interface ("API") of the broker layer 220 and perform other applications management tasks in an automated fashion using other interfaces, as will be described in more detail further below in accordance with some embodiments.

In one embodiment, the broker layer 220 acts as middleware between the client layer 210 and the node layer 230. The node layer 230 includes the nodes 232 on which software applications 235 are provisioned and executed. In one embodiment, each node 232 is a VM provisioned by an Infrastructure as a Service (IaaS) provider, such as Amazon™ Web Services. In other embodiments, the nodes 232 may be physical machines or VMs residing on a single physical machine. In one embodiment, the broker layer 220 is implemented on one or more machines, such as server computers, desktop computers, etc. In some embodiments, the broker layer 220 may be implemented on one or more machines separate from machines implementing each of the client layer 210 and the node layer 230, or may implemented together with the client layer 210 and/or the node layer 230 on one or more machines, or some combination of the above.

In one embodiment, the broker layer 220 includes a broker 222 that coordinates requests from the client layer 210 with actions to be performed at the node layer 230. One such request is new application creation. In one embodiment, when a user, using the command tools 214 at client layer 210, requests the creation of a new application 235, or some other action to manage the application 235, the broker 222 first authenticates the user using an authentication service 224. In one embodiment, the authentication service may comprise Streamline™, or may comprise some other authentication tool. Once the user has been authenticated and allowed access to the system by authentication service 224, the broker 222 uses a server orchestration system 226 to collect information and configuration information about the nodes 232.

In one embodiment, the broker 222 uses the Marionette Collective™ ("MCollective™") framework available from Puppet Labs™ as the server orchestration system 226, but other server orchestration systems may also be used. The server orchestration system 226, in one embodiment, functions to coordinate server-client interaction between multiple (sometimes a large number of) servers. In one embodiment, the servers being orchestrated are nodes 232, which are acting as application servers and web servers.

For example, if the broker 222 wanted to shut down all applications 235 on all even numbered nodes out of 100,000 nodes, the broker 222 would only need to provide one command to the server orchestration system 226. Then, the server orchestration system 226 would generate a separate message to all nodes 232 to shut down all applications 235 if the node 232 is even, and distribute the messages to the nodes 232 using a messaging and queuing system. Thus, in one embodiment, the broker 222 manages the business logic and model representing the nodes 232 and the applications 235 residing on the nodes, and acts as a controller that generates the actions requested by users via an API of the client tools 214. The server orchestration system 226 then takes those actions generated by the broker 222 and orchestrates their execution on the many nodes 232 managed by the system.

In one embodiment, the information collected about the nodes 232 can be stored in a data store 228. In one embodiment, the data store 228 can be a locally-hosted database or file store, or it can be a cloud based storage service provided by a Software-as-a-Service (SaaS) storage provider, such as Amazon™ S3™ (Simple Storage Service). The broker 222 uses the information about the nodes 232 and the applications 235 of the nodes 222 to model the application hosting service and to maintain records about the nodes. In one embodiment, node 232 data is stored in the form of a JavaScript Object Notation (JSON) blob or string that maintains key-value pairs to associate a unique identifier, a hostname, a list of applications, and other such attributes with the node.

In embodiments of the invention, the PaaS system architecture 200 of FIG. 2 is a multi-tenant PaaS environment. In a multi-tenant PaaS environment, each node 232 runs multiple applications 235 that may be owned or managed by different users and/or organizations. As such, a first customer's deployed applications 235 may co-exist with any other customer's deployed applications on the same node 232 (VM) that is hosting the first customer's deployed applications 235. This deployment of multiple applications 235 of multiple customers on a single node 232 (VM) is a cost-efficient solution for PaaS providers. However, deploying a multi-tenant PaaS solution raises a variety of concerns, including, for example, security. Specifically, security concerns exist in terms of separating multi-tenant applications 235 from each other, as well as separating multi-tenant applications 235 from the node 232 itself.

Embodiments of the invention provide for security between multi-tenant applications 235 hosted on node 232, and between the node 232 and the applications 235 as well, by setting up each node 232 to utilize a kernel namespace feature of an operating system (OS) of the node 232. The kernel namespace feature creates and maintains a separation between the applications 235, and between the applications 235 and the node 232. One embodiment of the interaction between the server orchestration system 226 and a node 232 to implement secure and separate creation and maintenance of multi-tenant applications on a single node in a PaaS environment is now described in more detail with reference to FIG. 3.

Figure 3:
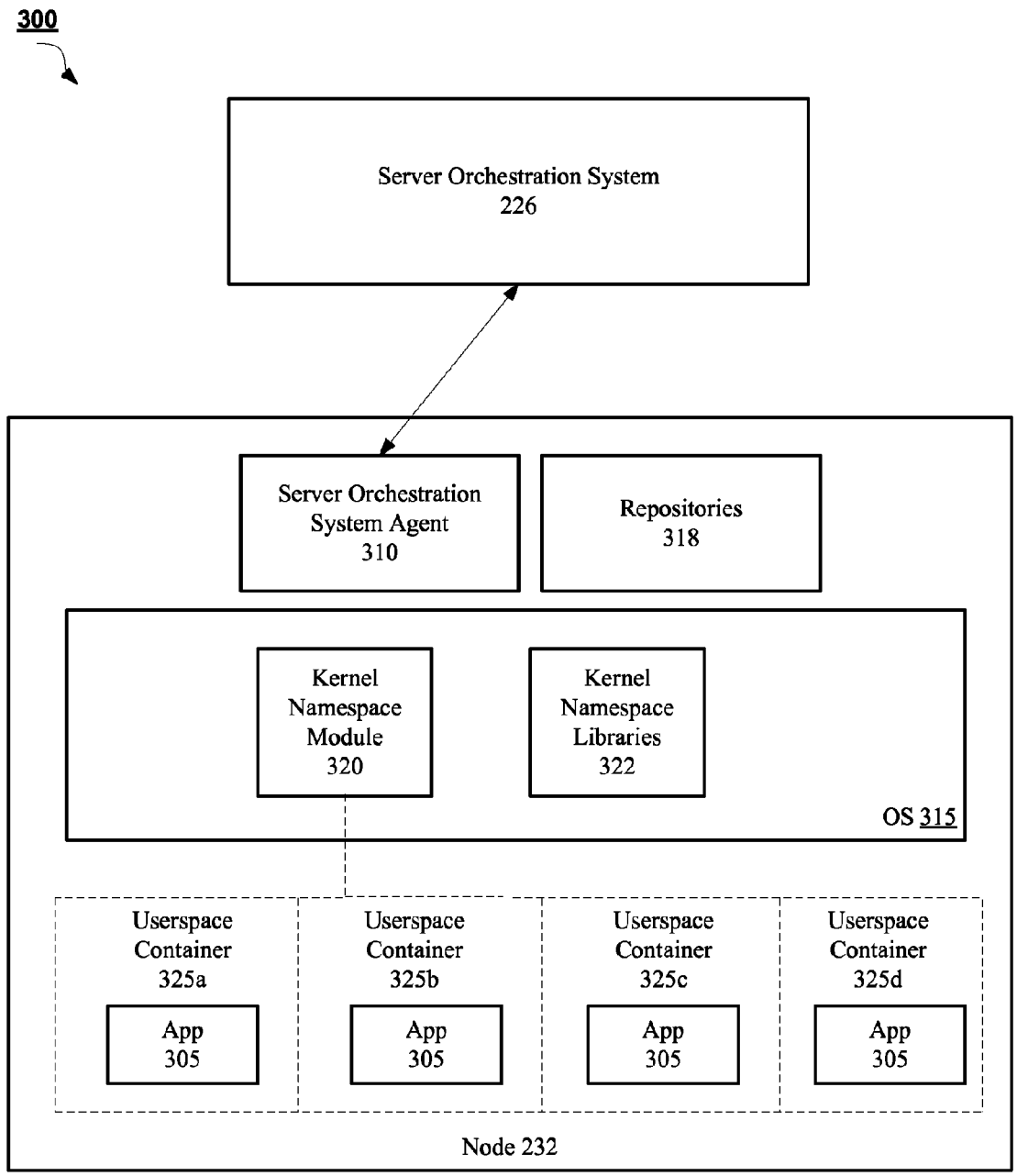
FIG. 3 is a block diagram of a communication infrastructure between a server orchestration system and a node according to embodiments of the invention.

FIG. 3 is a block diagram depicting a communication infrastructure 300 between a server orchestration system 225 and a node 232 according to embodiments of the invention. In one embodiment, server orchestration system 226 and node 232 are the same as their counterparts described with respect to FIG. 2. In one embodiment, node 232, which is implemented as a VM, has an operating system 315 that can execute applications 305 using the various software repositories 318 resident on the node 232. In one embodiment, applications 305 are the same as applications 235 described with respect to FIG. 2.

The node 232 may also include a server orchestration system agent 310 configured to track and collect information about the node 232 and to perform actions on the node 232. Thus, in one embodiment, using MCollective™ as the server orchestration system 226, the server orchestration system agent 310 can be implemented as a MCollective™ server. The server orchestration system 226 would then be the MCollective™ client that can send requests, queries, and commands to the MCollective™ server on node 232.

In one embodiment, server orchestration system agent 310 interacts with OS 315 to create and maintain several multi-tenant applications 305 that run on node 232. Specifically, a kernel namespace feature of the OS 315 is utilized to provide security and separation for each multi-tenant application 305 running on the node 232 and to protect the underlying node (VM) 232 and OS 315 from the multi-tenant applications 305. In an OS, such as OS 315, an example of a namespace is a directory. Kernel namespaces is a feature of a kernel of the OS 315 that allows different processes (i.e., applications 305) to have different views of a file system of the node 232. For example, if two applications 305 are configured utilizing a kernel namespace feature, then each application 305 would "see" different files when it viewed the /temp directory, even though the applications 305 searched exactly the same directory. This is because the kernel namespace feature provides each application 305 its own unique and dedicated directories and systems to work under.

In one embodiment, a kernel namespace module 320 of the OS 315 is configured to implement and provide the kernel namespace functionality to each multi-tenant application 305 executing on the node 232. When an application 305 is spun-up (i.e., created) on the node 232, the kernel namespace module 320 applies the kernel namespace feature to the application 305. More specifically, the kernel namespace module 320 separates processes (e.g., applications 305) such that they cannot "see" resources in other groups. In one embodiment, kernel namespace module 320 references kernel namespace libraries 322 to identify configuration data that is used to create the unique namespaces 325a-d for the applications 305. In some embodiments, the resources of an application that are "isolated" by the kernel namespace feature include identifying information of the application, files of the application, and commands of the application.

In some embodiments, the kernel namespace module 320 provides this separation of applications 305 by creating a dedicated and unique configuration directory for each application 305 when it is created on the node 232. Each application 305 gets their own namespace, or userspace container 325a-d, which addresses the above-described security concerns present in multi-tenant application nodes of a PaaS system. Using interfaces from the kernel of the OS 315, the OS 315 associates and/or tracks each application's 305 directories to the application's 305 dedicated and unique namespace directory created by the kernel namespace module 320.

For example, assume the temp directory for application 1 is located at /app1/tmp and the temp directory for application 2 is located at /app2/tmp. The kernel namespace module 320 configures the node 232 so that each application (1 and 2) can continue to reference the standard /tmp directory (without having to change code within the application), while only seeing the resources associated with the respective application and located at the application's specific temp directory (e.g., when application 1 references /tmp it sees resources located at /app1/tmp and when application 2 references /tmp it sees resources lcoated at /app2/tmp).

Because all operations on the OS 315 go through the OS kernel, the kernel operates can operate behind the scenes to make the node 232 environment appear normal to the application 305 (e.g., appears to application 305 that no data is being withheld from the application and that the application is the only one running on the node 232). The only way an application 305 would know that kernel namespaces are being invoked by the OS 315 is to log in as a different user (UID) and view the same directory from both accounts, thus seeing different resources. As a result, when an application 305 is run on the node 232, the application 305 is not visible to other applications 305 running on the node 232 and vice versa.

In some embodiments, in addition to using the namespace feature to hide /tmp/ directory files of applications from one another, the kernel namespace module 320 also replaces /bin/ directories (executables/binaries) and /etc/ directories (configuration files) of each application 305 with corresponding /bin/ and /etc/ directories in the dedicated and unique namespace of each application 305. In this way, the OS kernel maps any reference to the standard /bin or /etc directories by an application 305 to the corresponding dedicated directories in that application's namespace. Some exemplary results of this namespace configuration include that an application's UID cannot be seen by other applications 305 (except for in the /etc/psswd directory), and that system executables (not associated with a particular application 305) are hidden from applications 305 even though they are on the system.

In one embodiment, the kernel namespace feature applied by kernel namespace module 320 is pam_namespace, which is a feature of the Linux™ OS kernel. Pam_namespace is a Pluggable Authentication Module (PAM) module in the Linux™ OS that sets up a private namespace for a session with polyinstantiated directories. A polyinstantiated directory provides a different instance of itself based on user name (or when using SELinux™, user name, security context, or both). The pam_namespace module disassociates the session namespace from the parent namespace. Any mounts/unmounts performed in the parent namespace, such as mounting of devices, are not reflected in the session namespace.

In other embodiments, different kernel namespace features of other OS vendors may be utilized, such as Linux™ Containers (LCX) and other OS kernel namespace tools. In some embodiments, system calls of the OS 315 may be utilized to setup a new namespace. For example, in the Linux™ OS, the system calls 'clone' and 'unshare' can be used to set up a namespace.

Figure 4:
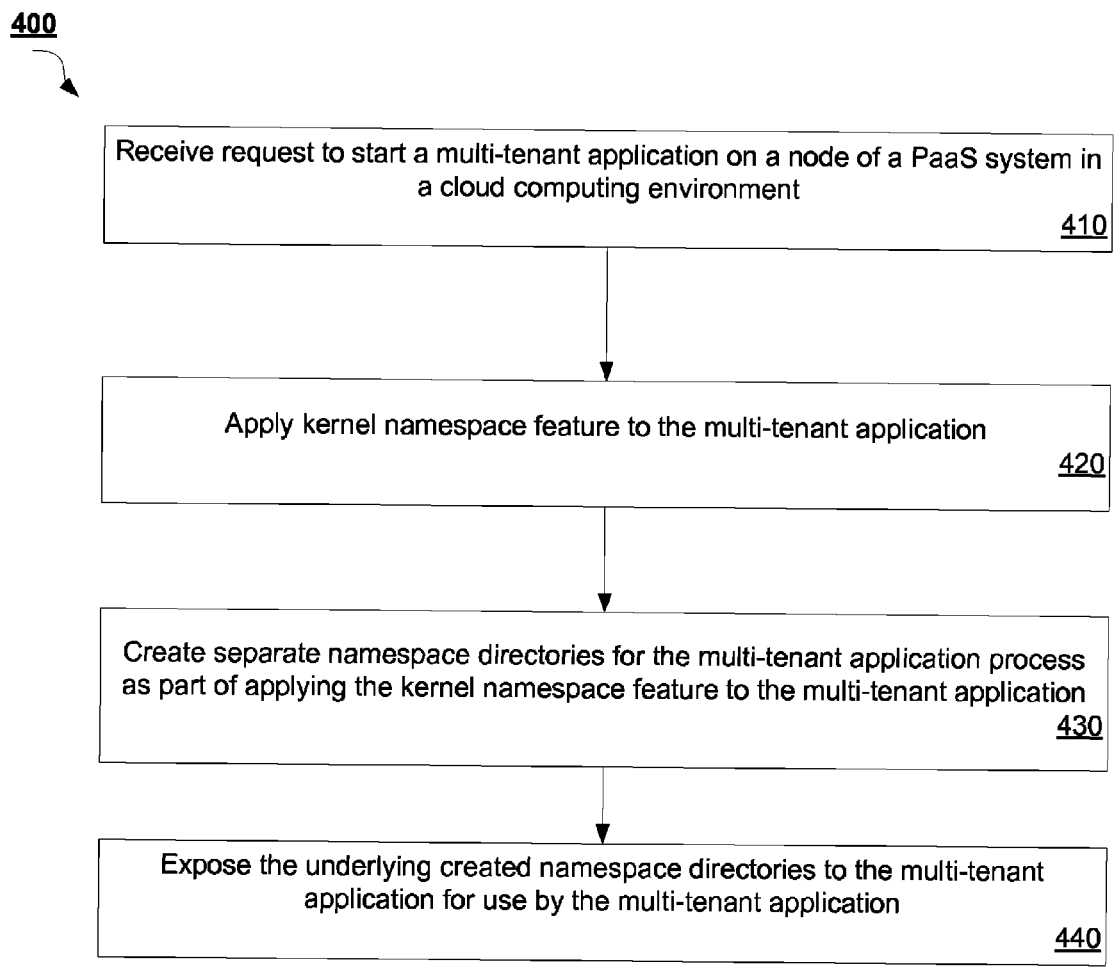
FIG. 4 is a flow diagram illustrating a method for using kernel namespaces to create and maintain multi-tenant applications in a PaaS environment of a cloud computing system according to an embodiment of the invention.

FIG. 4 is a flow diagram illustrating a method 400 for using kernel namespaces to create and maintain multi-tenant applications in a PaaS environment of a cloud computing system according to an embodiment of the invention. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by a node/VM executing on a computing device, such as node 232 described with respect to FIGS. 2 and 3.

Method 400 begins at block 410 where a request is received to start a multi-tenant application on a node of a PaaS system in a cloud computing environment. In one embodiment, the request is received at a server orchestration system agent of the node that interacts with a server orchestration system executing on a broker layer of the PaaS system. The request may identify an application, in the various software repositories resident on the node, to be initialized and started on the node.

At block 420, a kernel namespace feature is applied to the multi-tenant application as part of the initialization and start-up procedure of the application. The kernel namespace feature is implemented by a kernel of an OS of the node in order to provide a separate and unique namespace for the process of the application on the node, so that resources of the applications cannot be viewed by other processes (e.g., other multi-tenant applications) running on the node. At block 430, the OS kernel of the node creates a dedicated and unique configuration directory for the application. In one embodiment, the OS kernel utilizes a pam_namespace module to create the unique namespace directory for the application. In other embodiments, different kernel namespace features of other OS vendors may be utilized, such as Linux™ Containers (LCX) and other OS kernel namespace tools. In some embodiments, system calls of the OS 315 may be utilized to setup a new namespace. For example, in the Linux™ OS, the system calls 'clone' and 'unshare' can be used to set up a namespace.

At block 440, the underlying created namespace directories are exposed to the application for its subsequent use. As such, when the multi-tenant application is subsequently run, the OS kernel of the node applies the kernel namespace configurations (e.g., maps application directory calls to the corresponding directory in the application's dedicated namespace container) so that the application's resources (and thereby the application itself) is not visible to other multi-tenant applications running on the node and vice versa. This occurs without the application having to make any code changes on the application side (e.g., changes to its directory references, etc.). This is because each multi-tenant application on the node is set up with its own namespace, providing a secure environment for the multi-tenant applications on the node of the PaaS system.

Figure 5:
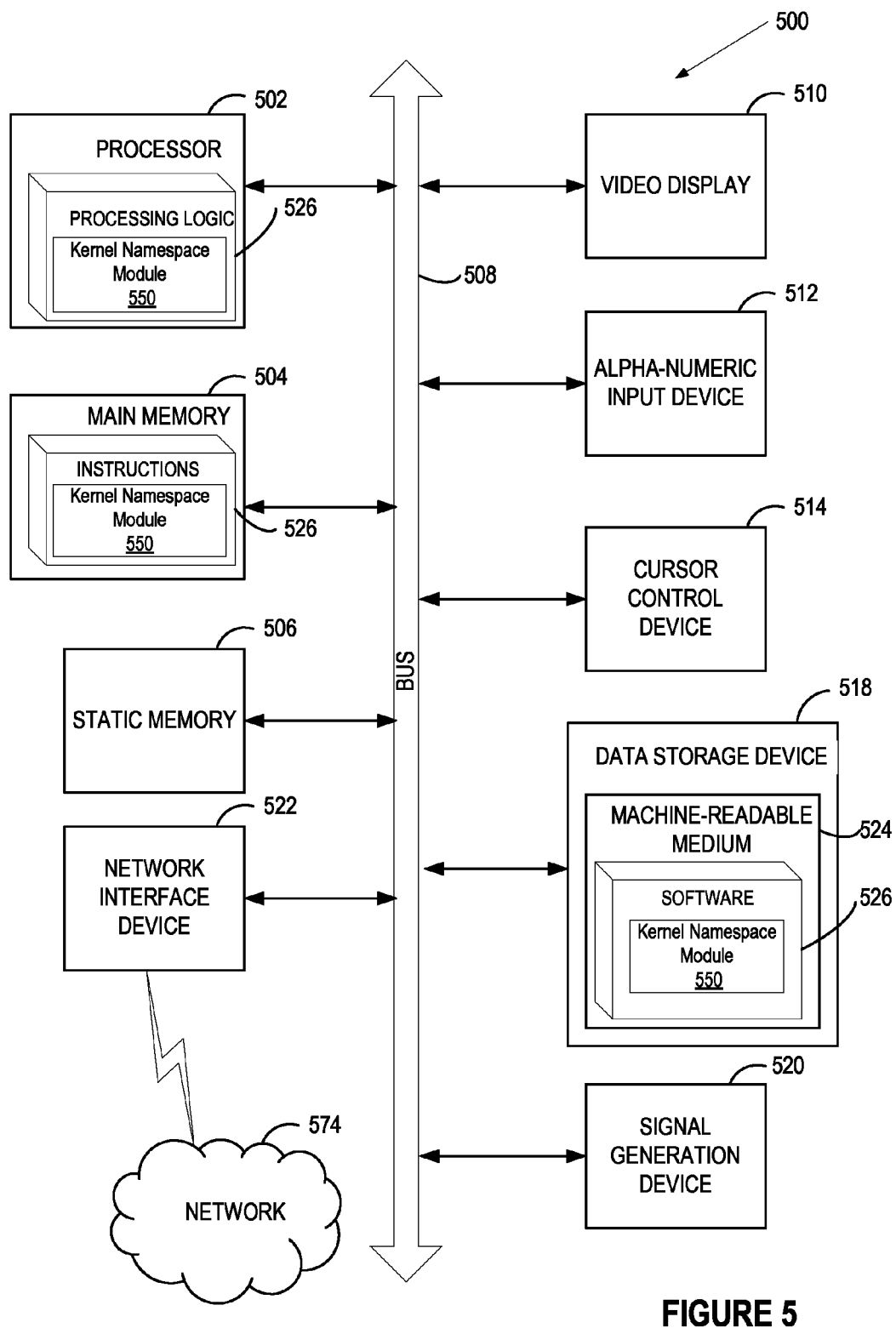
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein, illustrated in FIG. 5 by depicting instructions 526 within processor 502.

The computer system 500 may further include a network interface device 522. The computer system 500 also may include a video display unit 510 (e.g., a liquid crystal display (LCD), a cathode ray tube (CRT), or a touchscreen), an alphanumeric input device 512 (e.g., a keyboard), a cursor control device 514 (e.g., a mouse), and a signal generation device 520 (e.g., a speaker).

The data storage device 518 may include a machine-readable storage medium 524 (also known as a computer-readable storage medium) on which is stored software 526 (e.g., one or more sets of instructions, software, etc.) embodying any one or more of the methodologies or functions described herein. The software 526 may also reside, completely or at least partially, within the main memory 504 (e.g., instructions 526) and/or within the processor 502 (e.g., processing logic 526) during execution thereof by the computer system 500, the main memory 504 and the processor 502 also constituting machine-readable storage media. The software 526 may further be transmitted or received over a network 574 via the network interface device 522.

In one embodiment, the software 526 include instructions for a kernel namespace module 550, which may correspond to kernel namespace module 320 of FIG. 3, and/or a software library containing methods that call the kernel namespace module for creating and maintaining applications on a node in a multi-tenant PaaS environment in a cloud computing system. While the machine-readable storage medium 524 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of instructions for execution by the machine and that cause the machine to perform any one or more of the methodologies of the present invention. The term "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:

receiving, by a processing device of a virtual machine (VM) executing on a computing device in a Platform as a Service (PaaS) environment of a cloud computing system, a request to start an application on the VM, wherein the VM executes a plurality of multi-tenant applications that are each different software applications and each correspond to application owners that are different than an application owner of the requested application;

in response to receiving the request to start the application, creating, by the VM, a plurality of unique kernel namespace directories for a respective plurality of owners of the application, wherein each unique kernel namespace directory of the plurality of the unique kernel namespace directories corresponds to a separate owner of the plurality of owners of the application, wherein the plurality of unique kernel namespace directories for the plurality of owners of the application correspond to directories of an OS of the VM, and wherein each of the unique kernel namespace directories is different than other unique namespace directories corresponding to the plurality of owners of the application;

isolating resources of the application to the corresponding unique kernel namespace directories of the application;

providing, by the processing device of the VM, identification of the created unique namespace directories to the application, wherein the application does not update code of the application to access the unique kernel namespace directories of the application;

receiving, by the VM from the application, an access request to one of the directories on the OS;

mapping, by the VM, the requested directory to a corresponding unique kernel namespace directory of the application;

directing, by the VM in response to the access request, the application to the corresponding unique kernel namespace directory; and wherein when the application is executed on the VM, the plurality of unique namespace directories corresponding to the plurality of owners of the application cause resources of the application to be isolated from other owners of the plurality of multi-tenant applications executing on the VM.

2. The method of claim 1, wherein a pam_namespace module creates the plurality of unique kernel namespace directories.

3. The method of claim 1, wherein a kernel namespace feature creates the plurality of unique kernel namespace directories.

4. The method of claim 1, wherein one or more commands of a kernel of the OS of the VM comprising clone and unshare create the plurality of unique kernel namespace directories.

5. The method of claim 1, wherein the plurality of unique kernel namespace directories is created as part of initializing the application on the VM.

6. The method of claim 1, wherein the resources comprise configuration settings of the application, identifying information of the application, files of the application, and commands of the application.

7. The method of claim 1, wherein the plurality of unique namespace directories for the application comprises a unique namespace directory for a configuration directory of the application, a unique namespace directory for identifying information of the application, a unique namespace directory for files of the application, and a unique namespace directory for commands of the application.

8. An apparatus, comprising:

a memory;

a processing device communicably coupled to the memory; and a virtual machine (VM), in a Platform as a Service (PaaS) environment of a cloud computing system, to virtualize resources of the memory and the processing device, the VM to:

receive a request to start an application on the VM, wherein the VM executes a plurality of multi-tenant applications that are each different software applications and each correspond to application owners that are different than an application owner of the requested application;

in response to receiving the request to start the application, create a plurality of unique kernel namespace directories for a respective plurality of owners of the application, wherein each unique kernel namespace directory of the plurality of the unique kernel namespace directories corresponds to a separate owner of the plurality of owners of the application, wherein the plurality of unique kernel namespace directories for the plurality of owners of the application correspond to directories of an operating system (OS) of the VM, and wherein each of the unique kernel namespace directories is different than other unique namespace directories corresponding to the plurality of owners of the application;

isolate resources of the application to the corresponding unique kernel namespace directories of the application;

provide identification of the created unique namespace directories to the application, wherein the application does not update code of the application to access the unique kernel namespace directories of the application;

receive, from the application, an access request to one of the directories on the OS;

map the requested directory to a corresponding unique kernel namespace directory of the application;

direct, in response to the access request, the application to the corresponding unique kernel namespace directory; and wherein when the application is executed on the VM, the plurality of unique namespace directories corresponding to the plurality of owners of the application cause resources of the application to be isolated from other owners of the plurality of multi-tenant applications executing on the VM.

9. The apparatus of claim 8, wherein a pam_namespace module creates the plurality of unique kernel namespace directories.

10. The apparatus of claim 8, wherein a kernel namespace feature creates the plurality of unique kernel namespace directories.

11. The apparatus of claim 8, wherein one or more commands of the kernel comprising clone and unshare create the plurality of unique kernel namespace directories.

12. The apparatus of claim 8, wherein the resources comprise configuration settings of the application, identifying information of the application, files of the application, and commands of the application.

13. The apparatus of claim 8, wherein the plurality of unique namespace directories for the application comprises a unique namespace directory for a configuration directory of the application, a unique namespace directory for identifying information of the application, a unique namespace directory for files of the application, and a unique namespace directory for commands of the application.

14. The apparatus of claim 8, wherein the plurality of unique kernel namespace directories is created as part of initializing the application on the VM.

15. A non-transitory machine-readable storage medium including instructions that, when accessed by a processing device, cause the processing device to:
- receive, by a virtual machine (VM) executing by the processing device on a computing device in a Platform as a Service (PaaS) environment of a cloud computing system, a request to start an application on the VM, wherein the VM executes a plurality of multi-tenant applications that are each different software applications and each correspond to application owners that are different than an application owner of the requested application;
- in response to receiving the request to start the application, create a plurality of unique kernel namespace directories for a respective plurality of owners of the application, wherein each unique kernel namespace directory of the plurality of the unique kernel namespace directories corresponds to a separate owner of the plurality of owners of the application, wherein the plurality of unique kernel namespace directories for the plurality of owners of the application correspond to directories of an operating system (OS) of the VM, and wherein each of the unique kernel namespace directories is different than other unique namespace directories corresponding to the plurality of owners of the application;
- isolate resources of the application to the corresponding unique kernel namespace directories of the application;
- provide, by the VM, identification of the created unique namespace directories to the application, wherein the application does not update code of the application to access the unique kernel namespace directories of the application;
- receive, by the VM from the application, an access request to one of the directories on the OS;
- map, by the VM, the requested directory to a corresponding unique kernel namespace directory of the application;
- direct, by the VM in response to the access request, the application to the corresponding unique kernel namespace directory; and
- wherein when the application is executed on the VM, the plurality of unique namespace directories corresponding to the plurality of owners of the application cause resources of the application to be isolated from other owners of the plurality of multi-tenant applications executing on the VM.

16. The non-transitory machine-readable storage medium of claim 15, wherein at least one of a pam namespace module or a kernel namespace feature create the plurality of unique kernel namespace directories.

17. The non-transitory machine-readable storage medium of claim 15, wherein the resources comprise configuration settings of the application, identifying information of the application, files of the application, and commands of the application.

18. The non-transitory machine-readable storage medium of claim 15, wherein the plurality of unique namespace directories for the application comprises a unique namespace directory for a configuration directory of the application, a unique namespace directory for identifying information of the application, a unique namespace directory for files of the application, and a unique namespace directory for commands of the application.

19. The non-transitory machine-readable storage medium of claim 15, wherein the plurality of unique kernel namespace directories is created as part of initializing the application on the VM.

20. The non-transitory machine-readable storage medium of claim 15, wherein one or more commands of the kernel comprising clone and unshare create the plurality of unique kernel namespace directories.

* * * * *